(12) United States Patent
Müller et al.

(10) Patent No.: US 11,130,144 B2
(45) Date of Patent: Sep. 28, 2021

(54) METHOD FOR FILLING OF LACQUER

(71) Applicant: MG Colors GmbH, Eisingen (DE)

(72) Inventors: Gisbert Müller, Würzburg (DE); Michael Gallena, Würzburg (DE)

(73) Assignee: MG Colors GmbH, Eisingen (DE)

( * ) Notice: Subject to any disclaimer, the term of this patent is extended or adjusted under 35 U.S.C. 154(b) by 13 days.

(21) Appl. No.: 16/276,534

(22) Filed: Feb. 14, 2019

(65) Prior Publication Data

US 2019/0247876 A1    Aug. 15, 2019

(30) Foreign Application Priority Data

Feb. 14, 2018    (DE) .......................... 102018103339.7

(51) Int. Cl.
| | |
|---|---|
| *B05B 12/14* | (2006.01) |
| *G01F 23/20* | (2006.01) |
| *B05B 13/04* | (2006.01) |
| *G01G 17/06* | (2006.01) |
| *G01G 13/29* | (2006.01) |
| *G01G 19/22* | (2006.01) |

(52) U.S. Cl.
CPC .......... *B05B 12/1463* (2013.01); *B05B 13/04* (2013.01); *G01F 23/20* (2013.01); *G01G 13/2906* (2013.01); *G01G 17/06* (2013.01); *G01G 19/22* (2013.01)

(58) Field of Classification Search
CPC ..... B05B 12/1463; B05B 13/04; G01F 23/20; G01G 13/2906; G01G 17/06; G01G 19/22
USPC ......................................................... 141/83
See application file for complete search history.

(56) References Cited

U.S. PATENT DOCUMENTS

| | | | | |
|---|---|---|---|---|
| 5,148,841 A | * | 9/1992 | Graffin ...................... | B65B 3/28 141/128 |
| 2003/0041916 A1 | * | 3/2003 | Kohashi .................. | B67C 3/202 141/83 |
| 2009/0293986 A1 | * | 12/2009 | Blochlinger ........... | G01G 17/06 141/1 |

* cited by examiner

*Primary Examiner* — Timothy P. Kelly
*Assistant Examiner* — Christopher M Afful
(74) *Attorney, Agent, or Firm* — Mark Terry

(57) ABSTRACT

Method for filling of lacquer, including the steps:
A) providing a lacquer container containing lacquer and an opening valve;
B) providing a scale and a target container positioned on the scale;
C) taring the scale;
D) specifying a target weight and a target flow velocity;
E) specifying a first valve position $x_1$;
F) starting to fill the target container with lacquer by setting the opening valve to position $x_1$;
G) calculating a lacquer flow velocity;
H) comparing the lacquer flow velocity with the target flow velocity;
J) adjusting the lacquer flow velocity by setting to a valve position $x_2=x_1+\Delta x_1$ if the lacquer flow velocity does not correspond to the target flow velocity;
K) calculating a lacquer filling weight;
L) comparing the lacquer filling weight with the target weight; and
M) closing the opening valve when the lacquer filling weight corresponds to the target weight.

6 Claims, 4 Drawing Sheets

METHOD FOR FILLING OF LACQUER

CROSS-REFERENCE TO RELATED APPLICATIONS

This patent application claims priority to German utility patent application number 10 2018 103 339.7 filed Feb. 14, 2018 and titled "Method For Filling of Lacquer". The subject matter of patent application number 10 2018 103 339.7 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND

Methods for filling of lacquer are known, which include a simple weighing method, wherein a lacquer container is placed on a scale and is filled manually with lacquer until the scale has reached a target weight within a tolerance weight range.

In this process, the lacquer is filled into the lacquer container while the lacquer flows through a manually adjustable outlet into the lacquer container.

A problem associated with known methods for filling of lacquer is that the required high accuracy requires a great deal of talent on the part of the operator. This is also due to the varying composition of different types of lacquer, each of which exhibiting different flow characteristics.

The encountered problem in particular in connection with the manual filling of lacquer is that the filling is inaccurate. In particular in the case of formulations which are composed of a number of different types of lacquers, a large amount of rejects is produced, since the entire mixture is unusable due to an incorrect filling process alone.

SUMMARY

The invention relates to a method for filling of lacquer according to the independent claim.

It is the object of the present invention to eliminate the disadvantages of the state of the art and in particular to provide a method which is suitable for realizing a reliable filling of lacquer.

This object is achieved by a method for filling of lacquer according to the independent claim. Advantageous aspects constitute the subject-matter of the respective subclaims.

DETAILED DESCRIPTION

Figure 1:
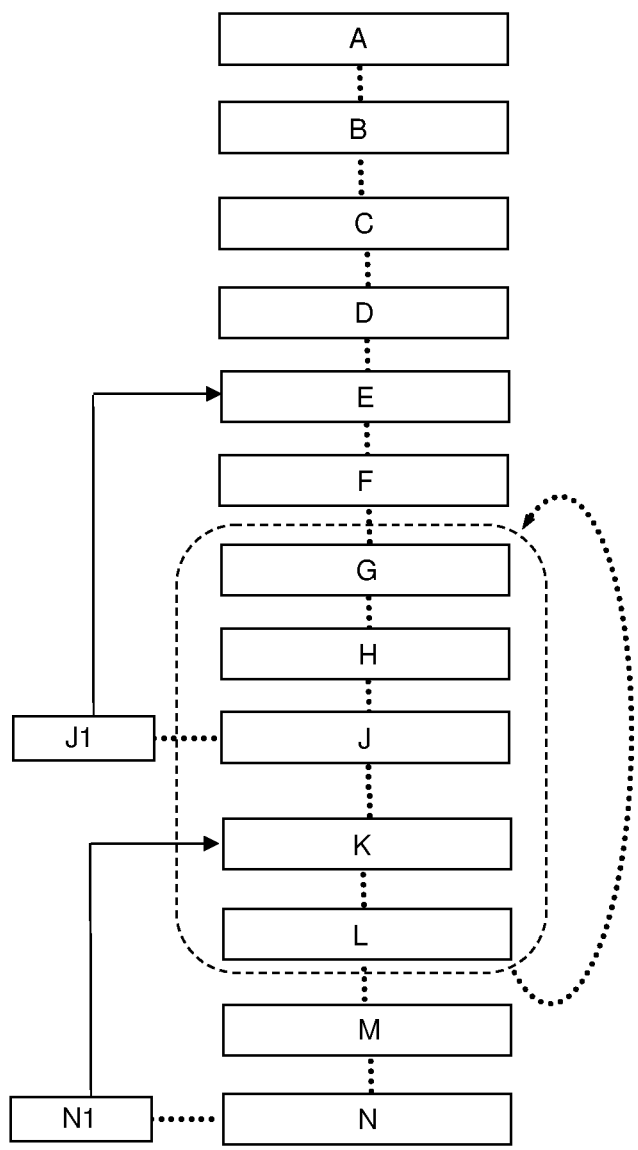
FIG. 1 shows a schematic view of the method for filling of lacquer.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The invention relates to a method for filling of lacquer, comprising the following method steps:

A) providing a lacquer container containing lacquer and an opening valve disposed at an end portion of the lacquer container;

B) providing a scale and a target container (empty or partially filled) positioned on the scale;

C) taring the scale taking into account the tare of the target container;

D) specifying a target weight and a target flow velocity;

E) specifying a first valve position $x_1$;

F) starting to fill the target container with lacquer from the lacquer container by setting the opening valve to the first valve position $x_1$;

G) calculating a lacquer flow velocity taking into account at least one lacquer weight in the target container;

H) comparing the lacquer flow velocity with the target flow velocity;

J) adjusting the lacquer flow velocity by setting the opening valve to a valve position $x_2 = x_1 + \Delta x_1$ if the lacquer flow velocity does not correspond to the target flow velocity;

K) calculating a lacquer filling weight taking into account the current lacquer weight in the target container and the lacquer flow velocity;

L) comparing the lacquer filling weight with the target weight; and

M) closing the opening valve when the lacquer filling weight corresponds to the target weight.

By matching the lacquer flow velocity with a target flow velocity, it is not a problem if the lacquer flow velocity varies. By comparing the lacquer filling weight with the target weight, more accurate and consistent filling of lacquer can be realized compared to manual filling. The method is not limited to the fact that the sequence of method steps A-M corresponds to a temporal sequence. For example, some method steps can be carried out simultaneously.

It is particularly preferred if method steps G, H, J, K and L are repeated a total of P−1 times (P=1, 2, 3, . . . ) periodically after a cycle time $\Delta t$. In this context, the opening valve is set to a valve position $x_{p+1} = x_p + \Delta x_p$ (with p=1, 2, 3, . . . , P) until the opening valve is closed when the lacquer filling weight corresponds to the target weight. The method can take into account a tolerance range for the target weight. The periodic setting of the opening valve makes it possible that the lacquer flow velocity can be periodically adjusted.

According to an advantageous aspect, the method comprises the method step: J1) storing at least one of valve positions $x_1, x_2, \ldots x_{P+1}$ in a database; and wherein method step E is carried out taking into account at least one valve position from the database. The at least one valve position provided from the database can be used to calculate a first valve position for the next filling of lacquer. The valve positions $x_1, x_2, \ldots$ refer to target lacquer flow velocities, where x1 is supposed to produce the slowest lacquer flow velocity, $x_2$ is slightly faster etc. The weighing process starts with $x_1$. As soon as the flow velocity is sufficiently stable, it is possible to switch to $x_2$. The prerequisite for this switch is that the residual weight is above a certain value. (A minimum residual weight is defined for each target flow velocity.) If the minimum residual weight of the current target flow velocity is undershot, it is reduced again to a lower level, for example, is switched from $x_3$ back to $x_2$. In this way, the valve positions are learned or checked when opening is performed. When the target weight is approached, only valve positions are used that can already be considered reliable. It is also advantageous if the cycle time is 0.01 sec.≤Δt≤0.1 sec. In practice, this cycle time allows the valve positions to be accurately adjusted.

It is preferred if the method comprises the method steps: N) determining a dripping weight and N1) storing the dripping weight in a database; and wherein method step K is carried out taking into account at least one dripping weight from the database. The dripping weight comprises the weight of the lacquer still entering the target container after the valve has been closed. The provision of a dripping weight allows a more accurate calculation of the lacquer filling weight.

According to a technical aspect, the method includes the opening of a drip guard. The drip guard can be disposed between the lacquer container and the target container and prevents unwanted dripping of lacquer from the lacquer container into the target container.

It is also advantageous if method step M comprises the periodic opening and closing of the opening valve after a period of time $\Delta t_2$ until the lacquer filling weight becomes equal to or greater than (within a tolerance weight range) the target weight. In this context, $\Delta t_2$ can be selected to be so short that only individual drops of lacquer are able to pass from the lacquer container into the target container.

A lacquer container for providing the method for filling of lacquer, comprising a control board, a drip guard and a stirrer is to be preferred. The control board can include a real-time capable microcontroller.

A lacquer filling system for carrying out the method for filling of lacquer, comprising at least one lacquer container, a scale, a target container and a conveyor belt is particularly advantageous. On the conveyor belt, several target containers can reach a lacquer container intended for the filling of lacquer in order to be filled. The opening valve thereby can be located at a bottom of the lacquer container so that lacquer can flow out of the lacquer container under the influence of gravity when the opening valve is open.

It is also advantageous if the conveyor belt includes a rail. The target containers are then able to move independently of each other.

A drip guard is preferably disposed between the lacquer container and the target container.

In the following, the invention will be explained in more detail with reference to figures.

FIG. 1 shows a schematic view of the method for filling of lacquer, comprising the following method steps:

A) providing a lacquer container containing lacquer and an opening valve disposed at an end portion of the lacquer container;

B) providing a scale and a target container (empty or partially filled) positioned on the scale;

C) taring the scale taking into account the tare of the target container;

D) specifying a target weight and a target flow velocity;

E) specifying a first valve position $x_1$;

F) starting to fill the target container with lacquer from the lacquer container by setting the opening valve to the first valve position $x_1$;

G) calculating a lacquer flow velocity taking into account at least one lacquer weight in the target container;

H) comparing the lacquer flow velocity with the target flow velocity;

J) adjusting the lacquer flow velocity by setting the opening valve to a valve position $x_2=x_1+\Delta x_1$ if the lacquer flow velocity does not correspond to the target flow velocity;

K) calculating a lacquer filling weight taking into account the current lacquer weight in the target container and the lacquer flow velocity;

L) comparing the lacquer filling weight with the target weight; and

M) closing the opening valve when the lacquer filling weight corresponds to the target weight.

The opening valve thereby can be located at a bottom of the lacquer container so that lacquer is able to flow out of the lacquer container under the influence of gravity when the opening valve is open.

Method steps G, H, J, K and L are preferably repeated P−1 times (P=1, 2, 3, . . . ) periodically after a cycle time Δt. In this context, the opening valve is set to a valve position $x_{p+1}=x_p+\Delta x_p$ (with p=1, 2, 3, . . . , P) until the opening valve is closed when the lacquer filling weight corresponds to the target weight (within a tolerance weight range). The periodic setting of the opening valve allows the lacquer flow velocity to be adjusted periodically. By setting the opening valve, the lacquer flow velocity is adjusted. In the example shown, the opening valve is further opened to increase the lacquer flow velocity when the calculated lacquer filling weight is less than the target weight and is further closed to reduce the lacquer flow velocity when the calculated lacquer filling weight is greater than the target weight. By repeating method steps G, H, J, K and L P−1 times (P=1, 2, 3, . . . ) periodically after a cycle time Δt, whereby the opening valve is set to a valve position $x_{p+1}=x_p+\Delta x_p$ (with p=1, 2, 3, . . . , P), the lacquer flow velocity can be periodically adjusted to the target flow velocity.

The method also comprises the method step of: J1) storing at least one of valve positions $x_1, x_2, \ldots, x_{P+1}$ in a database; and wherein method step E is carried out taking into account at least one valve position from the database. With the at least one valve position provided from the database, a first valve position $x_1$ can be calculated for the next filling of lacquer to provide a first valve position $x_1$ adjusted to a lacquer for the next filling of lacquer.

In the method shown, the cycle time is 0.01 sec.≤Δt≤0.1 sec. This cycle time allows an accurate adjustment of the valve positions.

The method further comprises method steps N) determining a dripping weight and N1) storing the dripping weight in a database; and wherein method step K is carried out taking into account at least one dripping weight from the database. The dripping weight includes the weight of the lacquer still entering the target container after the opening valve has been closed. The fact that the method includes storing the dripping weight in a database, and that method step K is carried out taking into account at least one dripping weight from the database, allows a more accurate calculation of the lacquer filling weight.

According to a technical aspect, the method comprises the opening of a drip guard (not shown in FIG. 1). The drip guard can be placed between the lacquer container and the target container and prevents unwanted dripping of lacquer from the lacquer container into the target container. The drip guard can be designed as a swivel plate Method step M comprises the periodic opening and closing of the opening valve after a period of time $\Delta t_2$ until the lacquer filling weight becomes equal to or greater than the target weight (within a tolerance weight range). In this regard, $\Delta t_2$ can be selected so as to be so short that only individual drops of lacquer are able to pass from the lacquer container into the target container.

Figure 2A:
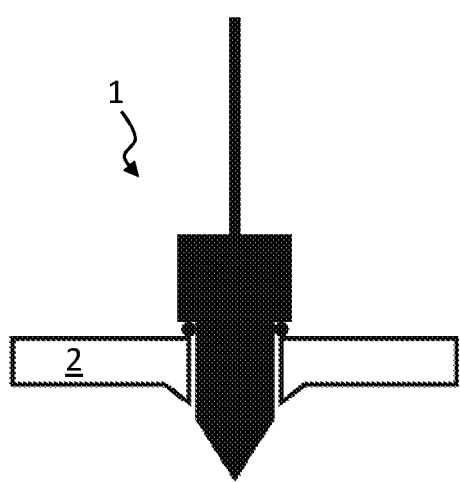
FIG. 2a shows a schematic cross-sectional view of a bottom of a lacquer container and an opening valve in a first closed valve position.
Figure 2B:
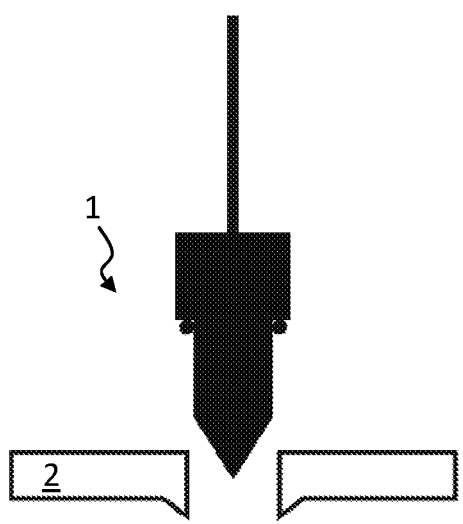
FIG. 2b shows a schematic cross-sectional view of a bottom of a lacquer container and an opening valve in a second open valve position.

FIG. 2a and FIG. 2b show two schematic cross-sectional views of a bottom of a lacquer container 2 and an opening valve 1 in a first and a second valve position. The opening valve 1 is arranged at an end portion of the lacquer container 2—in the example shown at the bottom of the lacquer container.

The open position in the example shown is the first valve position x1. During the process, the opening valve 1 is set to a valve position $x_p+1=x_p+\Delta x_p$ (with p=1, 2, 3, . . . , P) after a cycle time $\Delta t$ until the opening valve 1 is closed when the lacquer filling weight corresponds to the target weight (within a tolerance weight range). The periodic setting of the opening valve 1 allows a periodic adjustment of the lacquer flow velocity. By setting the opening valve 1, the lacquer flow velocity is adjusted. In the example shown, the opening valve 1 is opened further to increase the lacquer flow velocity when the calculated lacquer filling weight is less than or sufficiently remote from the target weight (so-called minimum residual weight), and closed further to reduce the lacquer flow velocity when the calculated lacquer filling weight is greater than the target weight or less than the minimum residual weight for the current flow velocity.

Figure 3:
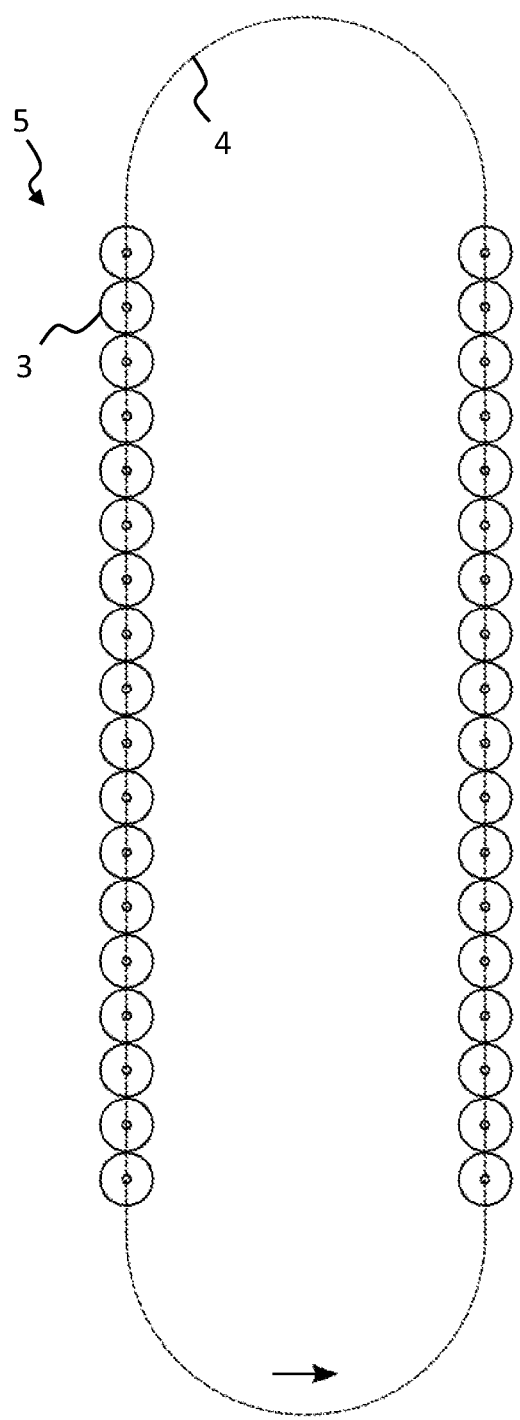
FIG. 3 shows a schematic view of a part of a lacquer filling system with a conveyor belt and target containers.

FIG. 3 shows a schematic view of a part of a lacquer filling system 5 with a conveyor belt 4 and target containers 3. The lacquer filling system 5 for providing the method for filling of lacquer comprises at least one lacquer container 2 (not shown in FIG. 3), a scale (not shown in FIG. 3), a target container 3 and a conveyor belt 4. In the example shown the lacquer filling system 5 comprises thirty-six target containers 3. The target containers 3 are arranged on the conveyor belt 4. The conveyor belt 4 is formed of rails and is configured in a peripherally closed manner By means of the conveyor belt 4 the target containers destined for filling of lacquer can be conveyed to a lacquer container 1 (not shown in FIG. 3) in order to be filled with the aid of the inventive method for filling of lacquer.

Figure 4:
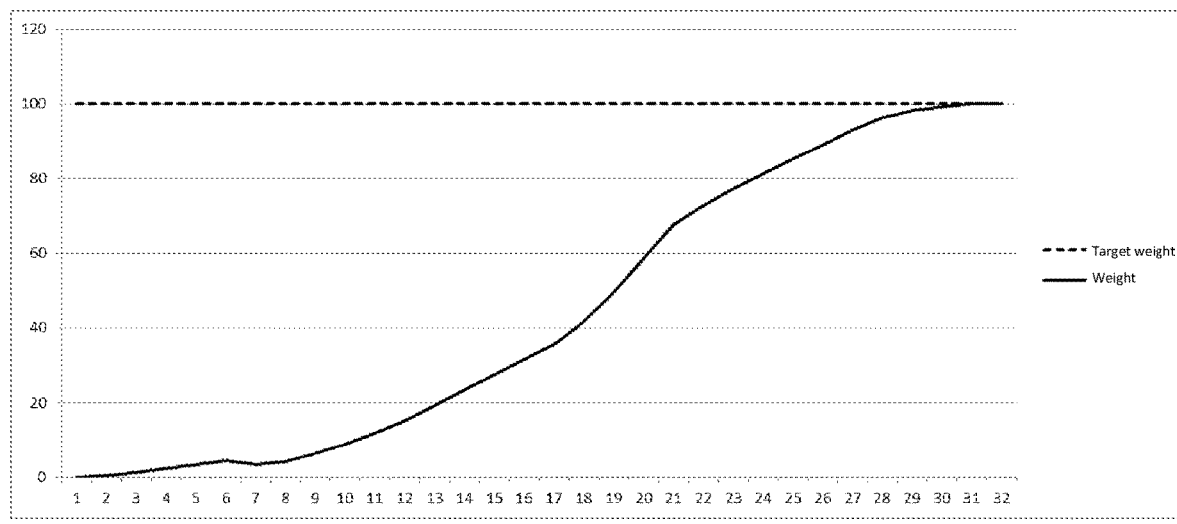
FIG. 4 shows a diagram representing target weight.
Figure 5:
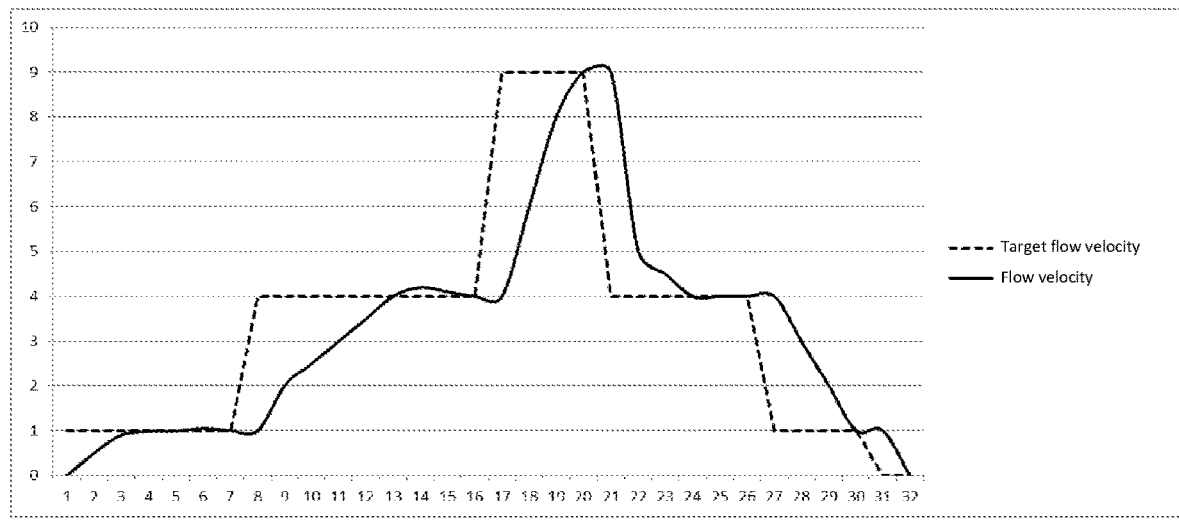
FIG. 5 shows a diagram representing flow velocity.
Figure 6:
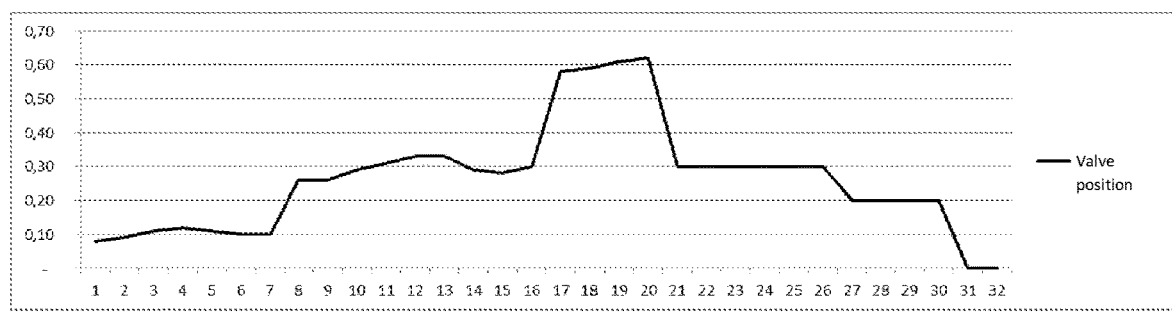
FIG. 6 shows a diagram representing valve position.

FIGS. 4 to 6 each show a diagram representing an exemplary weighing procedure based on the following values:

| target weight | weight | target flow velocity | flow velocity | valve position |
| --- | --- | --- | --- | --- |
| 100 | 0 | 1 | 0 | 0.08 |
| 100 | 0.5 | 1 | 0.5 | 0.09 |
| 100 | 1.4 | 1 | 0.9 | 0.11 |
| 100 | 2.38 | 1 | 0.98 | 0.12 |

-continued

| 100 | 3.37 | 1 | 0.99 | 0.11 |
| --- | --- | --- | --- | --- |
| 100 | 4.42 | 1 | 1.05 | 0.10 |
| 100 | 3.38 | 1 | 1 | 0.10 |
| 100 | 4.38 | 4 | 1 | 0.26 |
| 100 | 6.38 | 4 | 2 | 0.26 |
| 100 | 8.88 | 4 | 2.5 | 0.29 |
| 100 | 11.88 | 4 | 3 | 0.31 |
| 100 | 15.38 | 4 | 3.5 | 0.33 |
| 100 | 19.38 | 4 | 4 | 0.33 |
| 100 | 23.58 | 4 | 4.2 | 0.29 |
| 100 | 27.68 | 4 | 4.1 | 0.28 |

| target weight | weight | target flow velocity | target flow | valve position |
| --- | --- | --- | --- | --- |
| 100 | 31.68 | 4 | 4 | 0.30 |
| 100 | 35.68 | 9 | 4 | 0.58 |
| 100 | 41.68 | 9 | 6 | 0.59 |
| 100 | 49.68 | 9 | 8 | 0.61 |
| 100 | 58.68 | 9 | 9 | 0.62 |
| 100 | 67.68 | 4 | 9 | 0.30 |
| 100 | 72.68 | 4 | 5 | 0.30 |
| 100 | 77.18 | 4 | 4.5 | 0.30 |
| 100 | 81.18 | 4 | 4 | 0.30 |
| 100 | 85.18 | 4 | 4 | 0.30 |
| 100 | 89.18 | 4 | 4 | 0.30 |
| 100 | 93.18 | 1 | 4 | 0.20 |
| 100 | 96.18 | 1 | 3 | 0.20 |
| 100 | 98.18 | 1 | 2 | 0.20 |
| 100 | 99.18 | 1 | 1 | 0.20 |
| 100 | 100.18 | 0 | 1 | — |
| 100 | 100.18 | 0 | 0 | — |

FIG. 4 shows the target weight and the current weight. The slow start (at a low flow velocity), the faster increase in the middle and the slow approach towards the end of the filling process are clearly visible. (The optional periodic single-drop method is not shown here.)

FIG. 5 shows the target flow velocity and the current (actually measured) flow velocity. The process starts with the lowest flow velocity. As soon as velocity has become stable, it is increased (here twice). Approximately in the middle, the residual weight is so small that the current target flow velocity would be too high, so that it is reduced again by one level (also twice). Shortly before the end, the valve is closed.

FIG. 6 shows the actual valve position. It is constantly readjusted to maintain the desired target flow velocity. Towards the end, normally less "readjustment" is necessary.

What is claimed is:

1. Method for filling of lacquer, comprising the following method steps:
   A) providing a lacquer container containing lacquer and an opening valve disposed at an end portion of the lacquer container;
   B) providing a scale and a target container (empty or partially filled) positioned on the scale;
   C) taring the scale taking into account a tare of the target container;
   D) specifying a target weight and a target flow velocity;
   E) specifying a first valve position $x_1$;
   F) starting to fill of the target container with lacquer from the lacquer container by setting the opening valve to the first valve position $x_1$;
   G) calculating a lacquer flow velocity taking into account at least one lacquer weight in the target container;
   H) comparing the lacquer flow velocity with the target flow velocity;
   I) determining that the lacquer flow velocity does not correspond to the target flow velocity;

J) adjusting the lacquer flow velocity by setting the opening valve to a valve position $x_2=x_1+\Delta x_1$ when the lacquer flow velocity does not correspond to the target flow velocity;

K) calculating a lacquer filling weight taking into account a current lacquer weight in the target container and the lacquer flow velocity, determining a dripping weight and storing the dripping weight in a database;

L) comparing the lacquer filling weight with the target weight; and

M) closing the opening valve when the lacquer filling weight corresponds to the target weight within a tolerance weight range.

2. Method according to claim 1, wherein method steps G, H, I, J, K are repeated a total of P−1 times (P=1, 2, 3, . . . ) periodically after a cycle time $\Delta t$, wherein the opening valve is set to a valve position $x_{p+1}=x_p+\Delta x_p$ (with p=1, 2, 3, . . . , P) until the opening valve is closed when the lacquer filling weight corresponds to the target weight within a tolerance weight range.

3. Method according to claim 2, comprising the method step:

I1) storing at least one of valve positions $x_1, x_2, \ldots, x_{p+1}$ in a database;

and wherein method step E is carried out taking into account at least one valve position from the database.

4. Method according to claim 3, wherein the cycle time is $0.01\ s \leq \Delta t \leq 0.1\ s$.

5. Method according to claim 4, comprising the method steps:

M) determining a dripping weight and

M1) storing the dripping weight in a database;

and wherein method step J is carried out taking into account at least one dripping weight from the database.

6. Method according to claim 5, wherein method step L comprises periodically opening and closing of the opening valve after a period of time $\Delta t_2$ until the lacquer filling weight becomes equal to or greater than (within a tolerance weight range) the target weight.

* * * * *